United States Patent
Nakamura et al.

(10) Patent No.: US 11,339,284 B2
(45) Date of Patent: May 24, 2022

(54) RESIN COMPOSITION, CURED PRODUCT, FORMED BODY AND MANUFACTURING METHOD THEREOF, AND FILM CAPACITOR AND MANUFACTURING METHOD THEREOF

(71) Applicant: HITACHI CHEMICAL COMPANY, LTD., Tokyo (JP)

(72) Inventors: Kasumi Nakamura, Tokyo (JP); Tatsuhito Fukuhara, Tokyo (JP); Yasunori Kawabata, Tokyo (JP); Takahide Iwaya, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 47 days.

(21) Appl. No.: 16/759,601

(22) PCT Filed: Oct. 30, 2017

(86) PCT No.: PCT/JP2017/039163
§ 371 (c)(1),
(2) Date: Apr. 27, 2020

(87) PCT Pub. No.: WO2019/087259
PCT Pub. Date: May 9, 2019

(65) Prior Publication Data
US 2020/0347221 A1    Nov. 5, 2020

(51) Int. Cl.
| | | |
|---|---|---|
| *C08K 3/22* | (2006.01) | |
| *C08L 63/00* | (2006.01) | |
| *C08K 3/04* | (2006.01) | |
| *C08K 3/36* | (2006.01) | |
| *C08K 5/3492* | (2006.01) | |
| *C08K 7/24* | (2006.01) | |
| *H01G 4/224* | (2006.01) | |

(52) U.S. Cl.
CPC ............... *C08L 63/00* (2013.01); *C08K 3/04* (2013.01); *C08K 3/22* (2013.01); *C08K 3/36* (2013.01); *C08K 5/34922* (2013.01); *C08K 7/24* (2013.01); *H01G 4/224* (2013.01); *C08K 2003/2227* (2013.01); *C08K 2201/005* (2013.01); *C08L 2203/206* (2013.01)

(58) Field of Classification Search
CPC . C08K 3/013; C08K 3/22; C08K 3/36; C08K 5/349; C08K 7/24; C08K 2003/227; C08K 2201/005; C08K 5/34924; C08L 63/00; C08L 2203/206
USPC .......................................................... 524/496
See application file for complete search history.

(56) References Cited

U.S. PATENT DOCUMENTS

| | | | | |
|---|---|---|---|---|
| 2004/0198925 A1* | 10/2004 | Morita | ................... | C08L 61/04 525/525 |
| 2015/0017450 A1* | 1/2015 | Oka | ................... | C08G 59/4014 428/418 |
| 2017/0253691 A1* | 9/2017 | Shimamoto | .......... | C08G 59/504 |
| 2020/0347222 A1* | 11/2020 | Kawabata | ................ | H01G 4/18 |

FOREIGN PATENT DOCUMENTS

| | | |
|---|---|---|
| JP | H7-161578 A | 6/1995 |
| JP | 2001-114990 A | 4/2001 |
| JP | 2003-147052 A | 5/2003 |
| JP | 2010-077303 A | 4/2010 |
| JP | 2011-077154 A | 4/2011 |
| JP | 2012-214777 A | 11/2012 |
| JP | 2012-234932 A | 11/2012 |
| WO | 2007/100078 A1 | 9/2007 |
| WO | 2009/047886 A1 | 4/2009 |

OTHER PUBLICATIONS

Machine Translation of JP 2010-77303. (Year: 2010).*

* cited by examiner

*Primary Examiner* — Hannah J Pak
(74) *Attorney, Agent, or Firm* — Fitch, Even, Tabin & Flannery, L.L.P.

(57) ABSTRACT

A resin composition for casting, containing a curable component, a first filler, and a second filler that is different from the first filler, in which a ratio of a major axis of the first filler with respect to a thickness of the first filler is 3 to 25. A molded body including an element and a sealing portion that seals the element, in which the sealing portion contains the resin composition or a cured product thereof.

20 Claims, 4 Drawing Sheets

RESIN COMPOSITION, CURED PRODUCT, FORMED BODY AND MANUFACTURING METHOD THEREOF, AND FILM CAPACITOR AND MANUFACTURING METHOD THEREOF

CROSS-REFERENCE TO RELATED APPLICATIONS

This application is a U.S. national phase application filed under 35 U.S.C. § 371 of International Application No. PCT/JP2017/039163, filed Oct. 30, 2017, designating the United States, which is hereby incorporated herein by reference in its entirety.

TECHNICAL FIELD

The present invention relates to a resin composition, a cured product, a molded body, a method for producing the molded body, a film capacitor, and a method for producing the film capacitor.

BACKGROUND ART

Electronic components such as a film capacitor are used in, for example, power converters (power conditioners) in solar cells, industrial equipment, electric cars, and the like. A molded body used as an electronic component includes, for example, an element and a sealing portion that seals the element. For example, a film capacitor includes a film capacitor element and a sealing portion that seals the film capacitor element, and the film capacitor can be obtained by disposing the film capacitor element in a space of a mold member having a space for accommodating the film capacitor element, subsequently supplying a sealing material into the space to form the sealing portion (see, for example, the following Patent Literature 1). As the sealing portion, a cured product of a curable resin composition containing a resin material can be used.

CITATION LIST

Patent Literature

Patent Literature 1: Japanese Unexamined Patent Publication No. H7-161578

SUMMARY OF INVENTION

Technical Problem

According to the findings of the inventors, from the viewpoint of suppressing deterioration of a cured product that is used as a sealing portion for a film capacitor and securing excellent reliability, it is desirable to suppress the occurrence of differences in the physical properties inside a cured product, and particularly, it is desirable to suppress the occurrence of a specific gravity difference inside a cured product of a resin composition for casting.

The present invention has been achieved in view of such circumstances, and it is an object of the invention to provide a resin composition that is capable of suppressing the occurrence of a specific gravity difference inside a cured product, and a cured product of the resin composition. Furthermore, it is another object of the present invention to provide a molded body that uses the resin composition or a cured product thereof, and a method for producing the molded body. In addition, it is another object of the present invention to provide a film capacitor that uses the resin composition or a cured product thereof, and a method for producing the film capacitor.

Solution to Problem

The resin composition of the present invention is a resin composition for casting, containing a curable component, a first filler, and a second filler that is different from the first filler, in which a ratio of a major axis of the first filler with respect to a thickness of the first filler is 3 to 25.

Incidentally, when there is a portion in a cured product of a resin composition, in which physical properties such as thermal stability and mechanical strength are locally inferior, the cured product is liable to deteriorate from this portion where the physical properties are inferior as a starting point. In this regard, according to the resin composition of the present invention, since the occurrence of a specific gravity difference inside the cured product of the resin composition can be suppressed, the physical properties of the cured product are inhibited from being locally different. As a result, portions in which physical properties are locally inferior are inhibited from being formed in the cured product, and therefore, deterioration of the cured product can be suppressed, and thus, excellent reliability can be secured. In addition, according to the resin composition of the present invention, it is possible to maintain the viscosity of the resin composition low even in a case in which a solvent is not used, and the filling workability of the resin composition is excellent at the time of casting the resin composition.

It is preferable that the curable component includes an epoxy resin.

It is preferable that a viscosity of the resin composition when measured using a B type viscometer under the conditions of 40° C. and 60 rpm is 8.0 Pa·s or less.

It is preferable that the first filler contains expandable graphite. Furthermore, it is preferable that the first filler contains melamine cyanurate.

It is preferable that the second filler contains silica.

The cured product of the present invention is a cured product of the above-mentioned resin composition.

A molded body of the present invention includes an element and a sealing portion that seals the element, and the sealing portion contains the above-mentioned resin composition or a cured product thereof. In a method for producing a molded body of the present invention, a molded body is obtained by casting the above-mentioned resin composition.

A film capacitor of the present invention includes a film capacitor element and a sealing portion that seals the film capacitor element, and the sealing portion contains the above-mentioned resin composition or a cured product thereof. In a method for producing a film capacitor of the present invention, a film capacitor including a sealing portion that seals a film capacitor element is obtained by casting the above-mentioned resin composition.

Advantageous Effects of Invention

According to the present invention, it is possible to suppress the occurrence of a specific gravity difference inside the cured product, and excellent reliability can be secured. Furthermore, according to the present invention, it is possible to maintain the viscosity of the resin composition low even in a case in which a solvent is not used, and the filling workability of the resin composition is excellent at the time of casting the resin composition. According to the present invention, it is possible to provide a use of the resin composition to casting.

DESCRIPTION OF EMBODIMENTS

Hereinafter, embodiments of the present invention will be described in detail. However, the present invention is not intended to be limited to the following embodiments.

In the present specification, a numerical range that has been indicated by use of "to" indicates the range that includes the numerical values which are described before and after "to", as the minimum value and the maximum value, respectively. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in the examples. "A or B" may include either one of A and B, and may also include both of A and B. Materials listed as examples in the present specification can be used singly or in combinations of two or more, unless otherwise specifically indicated. In the present specification, when a plurality of substances corresponding to each component exist in the composition, the content of each component in the composition means the total amount of the plurality of substances that exist in the composition, unless otherwise specified.

<Resin Composition and Cured Product>

The resin composition of the present embodiment is a resin composition for casting. A molded body can be obtained by casting the resin composition of the present embodiment. The cured product of the present embodiment is a cured product of the resin composition of the present embodiment and can be obtained by curing the curable resin composition. The resin composition of the present embodiment and a cured product thereof exhibits, for example, black color. The cured product of the present embodiment can be used as a sealing portion that seals an element. By sealing an element using a sealing portion, deterioration of the element by moisture and the like can be suppressed.

The resin composition of the present embodiment contains a curable component, a first filler, and a second filler that is different from the first filler, and a ratio of a major axis of the first filler with respect to a thickness of the first filler (major axis of first filler/thickness of first filler; hereinafter, referred to as "aspect ratio") is 3 to 25. That is, the resin composition of the present embodiment contains at least two kinds of fillers, including a filler having an aspect ratio of 3 to 25.

According to the resin composition of the present embodiment, the occurrence of a specific gravity difference inside a cured product of the resin composition can be suppressed. The reason why such an effect is exhibited is not necessarily clearly known; however, the inventors suspect as follows.

Figure 1:
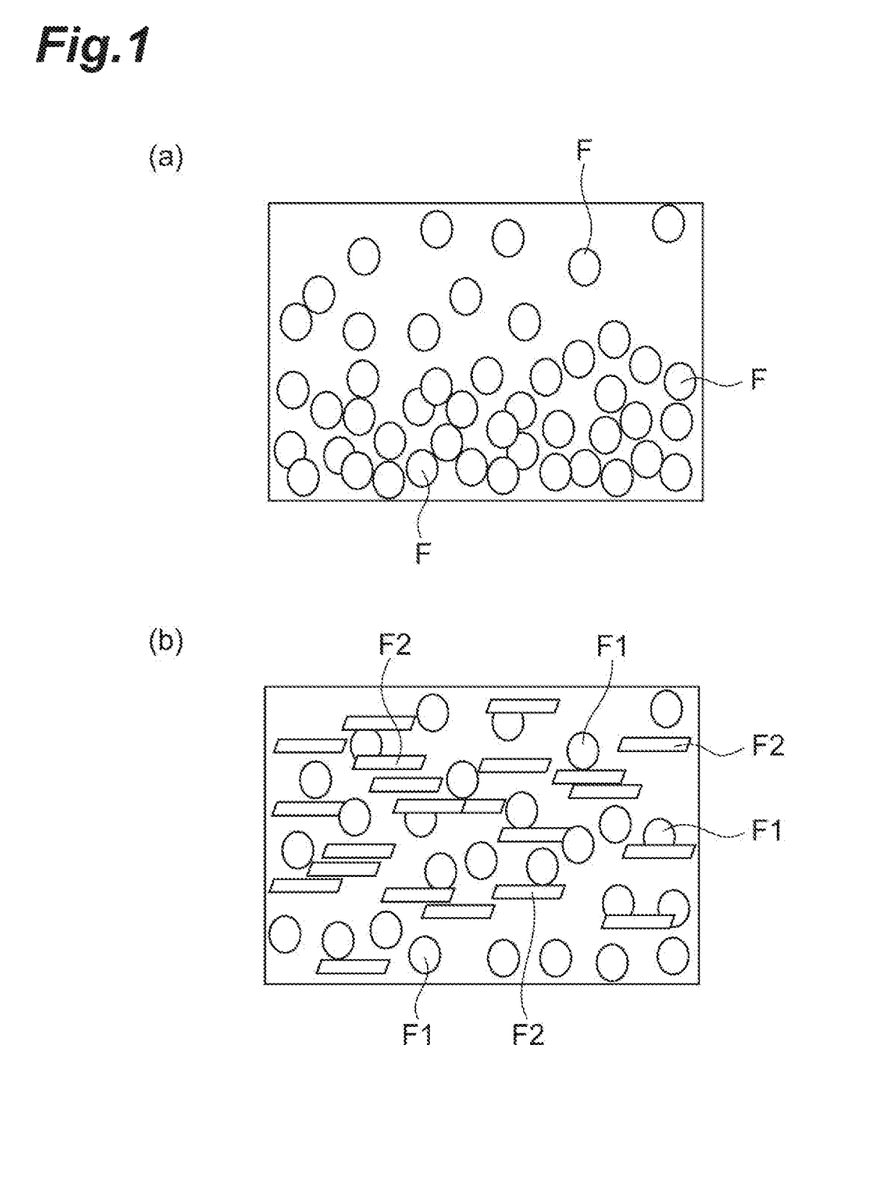
FIG. 1 is a diagram for describing the sedimentation of a filler.

That is, in a case in which fillers of a resin composition for casting do not contain the filler having the above-mentioned particular aspect ratio, as illustrated in FIG. 1(a), when the resin composition for casting is injected into a mold member, the filler F is liable to settle down excessively at the bottom side of the mold member in the resin composition. On the other hand, according to the resin composition of the present embodiment, as illustrated in FIG. 1(b), when the resin composition for casting is injected into a mold member, since the buoyancy of the first filler F1 having the above-mentioned particular aspect ratio is large, excessive sedimentation of the second filler F2 can be suppressed as the first filler F1 pushes up the second filler F2. Thereby, the fillers are inhibited from excessively settling down (uneven distribution of the fillers) at the bottom side of the mold member in the resin composition, and the fillers are uniformly dispersed, and therefore, the existing amounts of the fillers at the top side and the bottom side of the mold member in the resin composition are inhibited from being largely different from each other. As a result, the occurrence of a specific gravity difference inside the cured product can be suppressed.

In a case in which the resin composition of the present embodiment contains only a first filler without containing a second filler, it is difficult to suppress the occurrence of a specific gravity difference inside the cured product, as it is difficult for the filler to be dispersed in the resin composition, the amount of the filler dispersed at the bottom side of the mold member is excessively decreased, and the like, because the buoyancy of the first filler is high.

(Curable Component)

The curable component can include, for example, a curable resin and a curing agent. In a case in which a curable resin can be cured without using a curing agent, a curing agent may not be used.

As the curable component, it is possible to use a thermosetting component or a photocurable component, and as the curable resin, a thermosetting resin or a photocurable resin can be used. As the curable component, from the viewpoint of excellent curability, a thermosetting component is preferred. Examples of the thermosetting resin include an epoxy resin, a urea resin, a melamine resin, a polyester, a silicone resin, and a polyurethane. Examples of the photocurable resin include an acrylic resin and a methacrylic resin. From the viewpoint that the moisture permeability of the cured product is low, and deterioration of the element is easily prevented when an element is sealed by the cured product, it is preferable that the curable component includes an epoxy resin.

As the epoxy resin, a resin having two or more glycidyl groups in one molecule can be used. Examples of the epoxy resin include a bisphenol A type epoxy resin, a bisphenol AP type epoxy resin, a bisphenol AF type epoxy resin, a bisphenol B type epoxy resin, a bisphenol BP type epoxy resin, a bisphenol C type epoxy resin, a bisphenol E type epoxy resin, a bisphenol F type epoxy resin, a bisphenol G type epoxy resin, a bisphenol M type epoxy resin, a bisphenol S type epoxy resin, a bisphenol P type epoxy resin, a bisphenol PH type epoxy resin, a bisphenol TMC type epoxy resin, a bisphenol Z type epoxy resin, a bisphenol S type epoxy resin (hexanediol bisphenol S diglycidyl ether or the like), a novolac phenol type epoxy resin, a biphenyl type epoxy resin, a naphthalene type epoxy resin, a dicyclopentadiene type epoxy resin, a bixylenol type epoxy resin (bixylenol diglycidyl ether or the like), a hydrogenated bisphenol A type epoxy resin (hydrogenated bisphenol A glycidyl ether or the like), dibasic acid-modified diglycidyl ether type epoxy resins of these resins, and an aliphatic epoxy resin.

From the viewpoint that the moisture permeability of the cured product is low, and deterioration of the element is easily prevented when an element is sealed by the cured product, the content of the epoxy resin is preferably 50% by mass or more, more preferably 80% by mass or more, and even more preferably 90% by mass or more, based on the total mass of the curable resin. The content of the epoxy resin may be 100% by mass based on the total mass of the curable resin.

The content of the curable resin is preferably in the following range based on the total mass of the resin composition (excluding the mass of a solvent). From the viewpoint that an excessive increase in the viscosity of the resin composition is suppressed, and thereby handling of the resin composition is easy (workability is easily secured), the content of the curable resin is preferably 10% by mass or more, more preferably 15% by mass or more, even more preferably 18% by mass or more, and particularly preferably 20% by mass or more. From the viewpoint that a cured product having a low water absorption rate is easily obtained, the content of the curable resin is preferably 60% by mass or less, more preferably 50% by mass or less, even more preferably 40% by mass or less, and particularly preferably 30% by mass or less. From these viewpoints, the content of the curable resin is preferably 10% to 60% by mass.

As the curing agent, a compound having two or more of a functional group that reacts with a glycidyl group in one molecule can be used. Examples of the curing agent include a phenolic resin and an acid anhydride.

As the phenolic resin, a resin having two or more phenolic hydroxyl groups in one molecule can be used. Examples of the phenolic resin include a resin obtainable by condensing or co-condensing a phenol compound and/or a naphthol compound with an aldehyde compound in the presence of an acidic catalyst, a biphenyl skeleton type phenolic resin, a paraxylylene-modified phenolic resin, a metaxylylene-paraxylylene-modified phenolic resin, a melamine-modified phenolic resin, a terpene-modified phenolic resin, a dicyclopentadiene-modified phenolic resin, a cyclopentadiene-modified phenolic resin, a polycyclic aromatic ring-modified phenolic resin, and a xylylene-modified naphthol resin. Examples of the phenol compound include phenol, cresol, xylenol, resorcinol, catechol, bisphenol A, and bisphenol F. Examples of the naphthol compound include α-naphthol, β-naphthol, and dihydroxynaphthalene. Examples of the aldehyde compound include formaldehyde, acetaldehyde, propionaldehyde, benzaldehyde, and salicylaldehyde.

Examples of the acid anhydride include methyltetrahydrophthalic anhydride, methylhexahydrophthalic anhydride, phthalic anhydride, hexahydrophthalic anhydride, endomethylenetetrahydrophthalic anhydride, dodecenylsuccinic anhydride, and octenylsuccinic anhydride.

From the viewpoint that excellent strength of the cured product is easily obtained, and from the viewpoint that the moisture permeability of the cured product is low, and deterioration of the element is easily prevented when an element is sealed by the cured product, the content of the curing agent is preferably 10% to 55% by mass, more preferably 12% to 40% by mass, and even more preferably 15% to 30% by mass, based on the total mass of the resin composition (excluding a solvent such as an organic solvent).

The curable component may include a curing accelerator. Examples of the curing accelerator include a quaternary ammonium salt, an amine-based curing accelerator, and a phosphorus-based curing accelerator. Examples of the amine-based curing accelerator include an imidazole compound, an aliphatic amine, an aromatic amine, a modified amine, and a polyamide resin. Examples of the phosphorus-based curing accelerator include a phosphine oxide, a phosphonium salt, and a diphosphine.

(Filler)

The resin composition of the present embodiment contains a first filler having the above-mentioned particular aspect ratio (major axis of first filler/thickness of first filler) and a second filler that is different from the first filler, as at least two kinds of fillers (excluding the compound corresponding to the curable component).

The major axis of the first filler and the thickness of the first filler can be obtained by, for example, the following procedure. A filler as an object of measurement is dispersed in a curable component, thereby a cured product is produced, and then the cured product is cut such that the filler is exposed. Next, the cut surface is polished until the major axis (maximum length of the filler as a whole) and the thickness (maximum length in the thickness portion of the filler) of the filler can be identified. Then, the cut surface is observed using a scanning electron microscope (SEM) or an optical microscope, and the major axis and the thickness of the filler are measured.

Even in a case in which the filler is not dispersed in the cured product, the major axis and the thickness of the filler can be obtained using a scanning electron microscope or an optical microscope. That is, an observed image of the filler alone is obtained using a scanning electron microscope or an optical microscope, subsequently the maximum length of the filler as a whole in the observed image can be acquired as the major axis of the filler, and the maximum length of the thickness portion of the filler in the observed image can be acquired as the thickness of the filler.

Examples of the shape of the first filler include a scale-like shape, a micaceous shape, a plate shape, and a flat shape. The "scale-like shape" means, for example, a thin flaky shape like the scales of fish, and refers to a shape having a sufficiently large major axis with respect to the thickness. The external shape of the filler having the scale-like shape is not limited to a circular shape, and the external shape may also be an irregular shape.

Examples of the constituent material of the first filler include expandable graphite, scale-like graphite (excluding expandable graphite), melamine cyanurate, wollastonite, and flake-like silica. Expandable graphite is a material in which the crystal structure of graphite is expanded between layers, and for example, it is a graphite intercalation compound formed by intercalating a substance other than graphite into between layers of graphite. Expandable graphite can be obtained by, for example, immersing a graphite material in an acid (sulfuric acid, nitric acid, or the like) and then performing a heat-treatment. From the viewpoint that the flame retardancy is enhanced, the first filler can contain at least one selected from the group consisting of expandable graphite and melamine cyanurate.

From the viewpoint that the occurrence of a specific gravity difference inside the cured product is easily suppressed, it is preferable that the specific gravity (true specific gravity) of the first filler is smaller than the specific gravity (true specific gravity) of the second filler. From the viewpoint that the occurrence of a specific gravity difference inside the cured product is easily suppressed, it is preferable that the specific gravity of the first filler is smaller than the specific gravity of the curable component.

From the viewpoint of suppressing the occurrence of a specific gravity difference inside the cured product, the aspect ratio of the first filler is 3 to 25. When the aspect ratio is lower than 3, since sufficient buoyancy of the first filler is not obtained, the first filler cannot push up the second filler, and it is difficult to suppress excessive sedimentation of the second filler. When the aspect ratio is higher than 25, it is difficult for the first filler to be dispersed in the resin composition, and it is difficult to suppress excessive sedimentation of the second filler.

From the viewpoint that the occurrence of a specific gravity difference inside the cured product is easily suppressed, the aspect ratio of the first filler is preferably 5 or higher, more preferably 8 or higher, even more preferably 9 or higher, and particularly preferably 10 or higher. From the viewpoint that the first filler is easily dispersed in the resin composition, the aspect ratio of the first filler is preferably 20 or lower, more preferably 15 or lower, even more preferably 12 or lower, and particularly preferably 11 or lower. From these viewpoints, the aspect ratio of the first filler is preferably 5 to 20.

From the viewpoint that the occurrence of a specific gravity difference inside the cured product is easily suppressed, the major axis of the first filler is preferably 2 µm or more, more preferably 5 µm or more, even more preferably 10 µm or more, and particularly preferably 12 µm or more. From the viewpoint that the first filler is easily dispersed in the resin composition, the major axis of the first filler is preferably 800 µm or less, more preferably 600 µm or less, even more preferably 400 µm or less, particularly preferably 200 µm or less, extremely preferably 100 µm or less, and highly preferably 50 µm or less. From these viewpoints, the major axis of the first filler is preferably 5 to 800 µm. The major axis of the first filler can be measured by observing a cross-section of the cured product using a scanning electron microscope or an optical microscope, similarly to the measurement of the aspect ratio. It is preferable that the average major axis of the first filler is also in these ranges.

The content of the first filler is preferably in the following range based on the total mass of the resin composition (excluding the mass of a solvent). From the viewpoint that the occurrence of a specific gravity difference inside the cured product is easily suppressed, the content of the first filler is preferably 1.5% by mass or more, more preferably 1.8% by mass or more, and even more preferably 2% by mass or more. From the viewpoint that the first filler is easily dispersed in the resin composition, the content of the first filler is preferably 30% by mass or less, more preferably 25% by mass or less, even more preferably 20% by mass or less, particularly preferably 10% by mass or less, extremely preferably 8% by mass or less, highly preferably 7% by mass or less, and even more preferably 6% by mass or less. From these viewpoints, the content of the first filler is preferably 1.5% to 30% by mass.

The content of the first filler is preferably in the following range based on the total amount of the filler (sum amount of the first filler and the second filler). From the viewpoint that the occurrence of a specific gravity difference inside the cured product is easily suppressed, the content of the first filler is preferably 1% by mass or more, more preferably 3% by mass or more, even more preferably 5% by mass or more, and particularly preferably 6% by mass or more. From the viewpoint that the first filler is easily dispersed in the resin composition, the content of the first filler is preferably 15% by mass or less, more preferably 12% by mass or less, even more preferably 10% by mass or less, and particularly preferably 9% by mass or less. From these viewpoints, the content of the first filler is preferably 1% to 15% by mass.

As the second filler, for example, a filler that does not have the above-mentioned particular aspect ratio (a spherical filler, a crushed filler, or the like) may be mentioned. Examples of the constituent material of the second filler include silica, carbon black, aluminum hydroxide, magnesium hydroxide, aerosil, alumina, calcium carbonate, calcium silicate, mica, talc, clay, titanium white, silicon nitride, and silicon carbide. Examples of the silica include crystalline silica and molten silica. From the viewpoint of excellent affinity (compatibility) with the curable component and excellent general-purpose usability, the second filler preferably contains at least one selected from the group consisting of silica and aluminum hydroxide, and more preferably contains silica.

From the viewpoint that an excessive increase in the viscosity of the resin composition is suppressed, and thereby handling of the resin composition is easy (workability is easily secured), the particle size of the second filler is preferably 3 µm or more, more preferably 5 µm or more, and even more preferably 10 µm or more. From the viewpoint that the occurrence of a specific gravity difference inside the cured product is easily suppressed, the particle size of the second filler is preferably 30 µm or less, more preferably 20 µm or less, and even more preferably 15 µm or less. From these viewpoints, the particle size of the second filler is preferably 3 to 30 µm. The particle size of the second filler can be measured using a laser diffraction particle size distribution meter (manufactured by HORIBA, Ltd., trade name: LA920). It is preferable that the average particle size of the second filler is also in each of these ranges.

The content of the second filler is preferably in the following range based on the total mass of the resin composition (excluding the mass of a solvent). From the viewpoint that excellent strength of the cured product is easily obtained, and from the viewpoint that the moisture permeability of the cured product is low, and deterioration of the element is easily prevented when an element is sealed by the cured product, the content of the second filler is preferably 30% by mass or more, more preferably 35% by mass or more, even more preferably 40% by mass or more, and particularly preferably 45% by mass or more. From the viewpoint that an excessive increase in the viscosity of the resin composition is suppressed, and thereby handling of the resin composition is easy (workability is easily secured), the content of the second filler is preferably 90% by mass or less, more preferably 85% by mass or less, even more preferably 80% by mass or less, and particularly preferably 70% by mass or less. From these viewpoints, the content of the second filler is preferably 30% to 90% by mass.

(Other Additives)

The resin composition of the present embodiment can contain additives that are different from the curable component and the fillers. Examples of the additives include an antifoaming agent, a flame retardant, a coupling agent, a reaction diluent, a flexibilizer, a pigment, a coloring agent, and a solvent.

(Viscosity)

Regarding the viscosity of the resin composition when measured using a B type viscometer under the conditions of 40° C. and 60 rpm, from the viewpoint that the filling workability of the resin composition at the time of casting the resin composition is excellent, the viscosity is preferably 8.0 Pa·s or less, more preferably 7.0 Pa·s or less, even more preferably 5.0 Pa·s or less, particularly preferably 3.0 Pa·s or less, and extremely preferably 2.0 Pa·s or less. The viscosity may be, for example, 1.0 Pa·s or more.

<Molded Body>

The molded body of the present embodiment includes an element and a sealing portion that seals the element, and the sealing portion contains the resin composition of the present embodiment or a cured product thereof. Examples of the molded body include electronic components such as a capacitor (a film capacitor or the like), a chip inductor, a reactor, a transformer, a molded coil, an LSI chip, an IC chip, a sensor (a tire air pressure sensor or the like), and an engine control unit (ECU).

Figure 2:
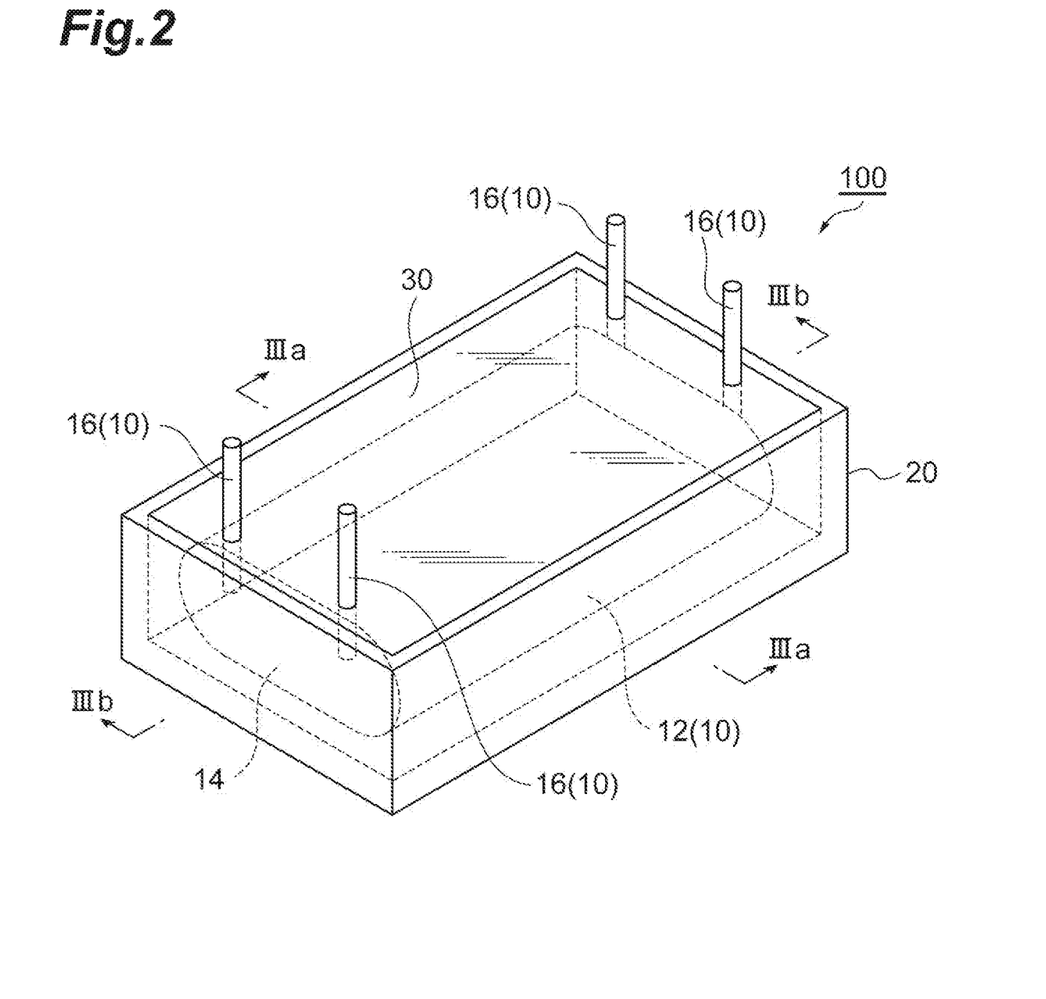
FIG. 2 is a perspective view illustrating a molded body of an embodiment of the present invention.
Figure 3:
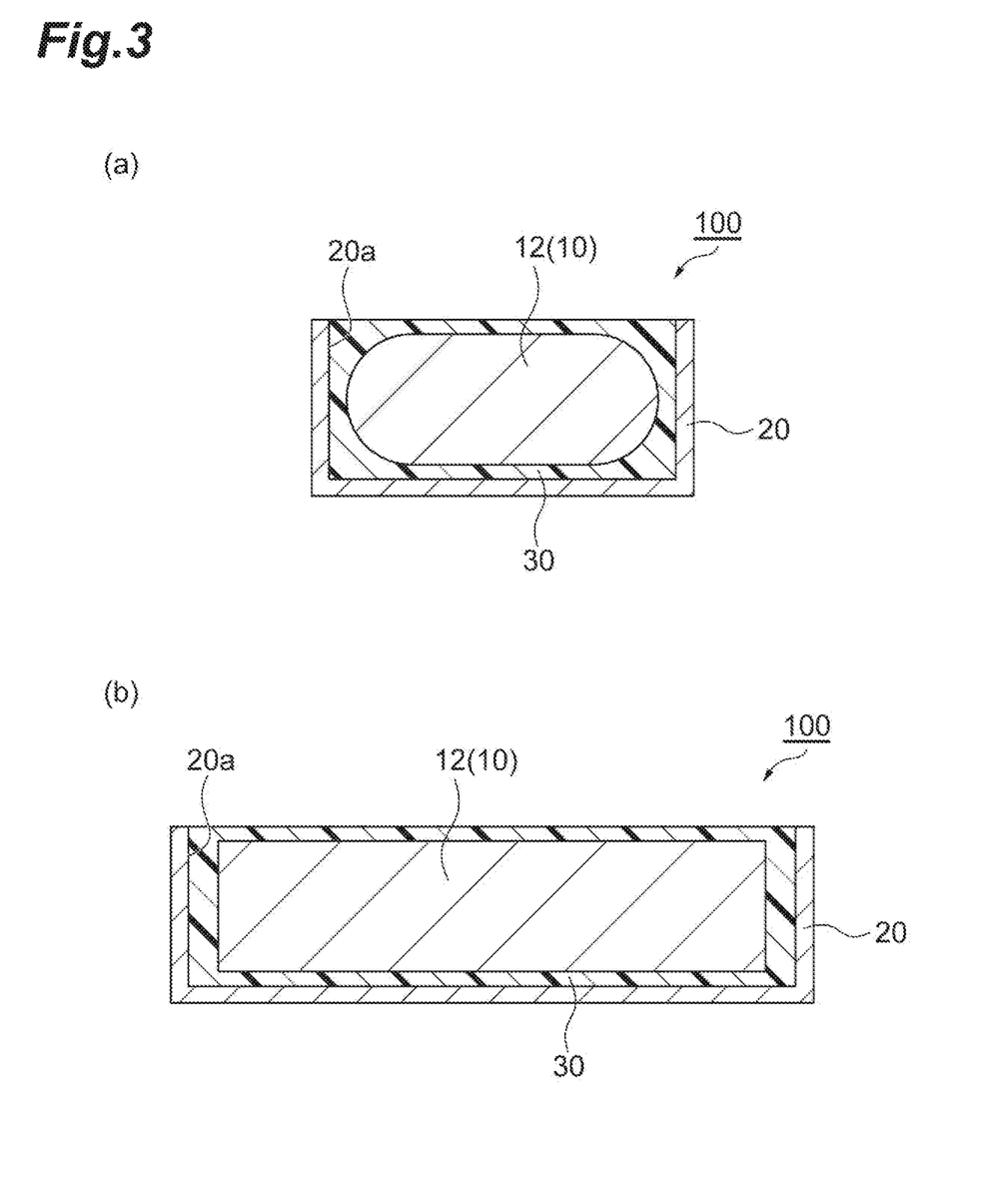
FIG. 3 is an end view illustrating the molded body of an embodiment of the present invention.

FIG. 2 is a perspective view illustrating a film capacitor as an example of the molded body of the present embodiment. FIG. 3 is an end view illustrating a film capacitor as an example of the molded body of the present embodiment. FIG. 3(a) is an end view of FIG. 2 cut along line IIIa-IIIa. FIG. 3(b) is an end view of FIG. 2 cut along line IIIb-IIIb.

A film capacitor (molded body) 100 illustrated in FIG. 2 and FIG. 3 is a case type film capacitor. The film capacitor 100 includes a film capacitor element (film capacitor rolled element) 10; an exterior case (case) 20 having a bottom and an element accommodating space 20a that accommodates the film capacitor element 10; and a sealing portion 30 that seals the film capacitor element 10 inside the element accommodating space 20a. The sealing portion 30 contains the cured product of the resin composition of the present embodiment.

The film capacitor element 10 has, for example, a rolled body 12, a metallikon electrode 14, and a lead wire 16. A method for producing the film capacitor element 10 includes, for example, a step of rolling a member obtainable by subjecting a resin film to metal vapor deposition (metalized film), and thus obtaining the rolled body 12; a step of subjecting both end faces of the rolled body 12 in a direction orthogonal to the rolling direction of the resin film, to vapor deposition (metallikon treatment) of a metal (metallikon material), and thus obtaining the metallikon electrode 14; and a step of connecting the lead wire 16 to the metallikon electrode 14. Examples of the resin film include a polyethylene terephthalate (PET) film and a polypropylene (PP) film. Examples of the metal for the metal vapor deposition include zinc, tin, and aluminum. For example, the rolled body 12 is a cylindrical body having an approximately elliptical-shaped cross-section. The metallikon electrode 14 can be formed over the respective entire surfaces of the both end faces of the rolled body 12. Examples of the metal for the metallikon electrode 14 include zinc, tin, and aluminum. Regarding the lead wire 16, for example, two lead wires are disposed on each of the both end faces of the rolled body 12, and the two lead wires 16 are disposed on each of the both end faces so as to be separated apart from each other in the longitudinal direction of the end face. For example, the lead wires 16 are connected to the metallikon electrode 14 by means of solder.

For example, the exterior case 20 has a rectangular parallelepiped shape, and has the element accommodating space 20a having a rectangular parallelepiped-shape inside thereof. In the upper part of the exterior case 20, an opening portion that is in communication with the element accommodating space 20a is formed. The exterior case 20 is formed from, for example, polyphenylene sulfide (PPS), polybutylene terephthalate (PBT), or the like. The lead wire 16 of the film capacitor element 10 extends in the opening direction of the opening portion of the exterior case 20, and the portion at the tip side of the lead wire 16 protrudes out of the element accommodating space 20a.

For example, the sealing portion 30 fills the inside of the element accommodating space 20a of the exterior case 20 so as to cover the entirety of the rolled body 12 of the film capacitor element 10 (so that the rolled body 12 is not exposed to the outside). Inside the sealing portion 30, the sealing portion 30 is interposed between the film capacitor element 10 and the bottom face of the exterior case 20, and the film capacitor element 10 is disposed to be separated apart from the bottom face of the exterior case 20. Inside the sealing portion 30, the sealing portion 30 is interposed between the film capacitor element 10 and the side wall of the exterior case 20, and the film capacitor element 10 is disposed to be separated apart from the side wall of the exterior case 20. In a case in which the sealing portion 30 is interposed between the film capacitor element 10 and the exterior case 20 as such, the film capacitor element 10 is likely to be sufficiently protected by the sealing portion 30, and therefore, the film capacitor is likely to acquire a prolonged life.

<Method for Producing Molded Body>

In the method for producing a molded body of the present embodiment, the resin composition of the present embodiment is cast, and thereby a molded body is obtained. The method for producing a molded body of the present embodiment includes, for example, a resin supplying step of supplying the resin composition of the present embodiment as a curable sealing material into a mold member (a casting mold, a frame body); and a curing step of curing the resin composition and obtaining a molded body, in this order. Examples of the molding method include vacuum casting, insert molding, injection molding, extrusion molding, and transfer molding.

As an example of the method for producing a molded body of the present embodiment, in the method for producing a film capacitor of the present embodiment, the resin composition of the present embodiment is cast, and thereby a film capacitor including a sealing portion that seals a film capacitor element is obtained. The method for producing a film capacitor of the present embodiment includes, for example, a resin supplying step of supplying the resin composition of the present embodiment as a curable sealing material into an element accommodating space of an exterior case (case); and a curing step of curing the resin composition, in this order.

In the resin supplying step, the resin composition (curable sealing material) of the present embodiment is supplied into an element accommodating space where a film capacitor element is accommodated. The resin supplying step can be carried out, for example, under the conditions of a temperature of 20° C. to 90° C. in a vacuum. In the resin supplying step, for example, the resin composition may be interposed between a film capacitor element and the bottom face of the exterior case, as the film capacitor element floats by buoyancy to the liquid surface of the resin composition concomitantly with the supply of the resin composition.

In the curing step, the resin composition supplied into the element accommodating space is cured, and thereby a cured product is obtained. In the curing step, for example, a thermosetting resin composition is heated, and thereby a cured product is obtained. The curing temperature for the resin composition is preferably 110° C. or lower. The curing step can be carried out, for example, under the conditions of 85° C. to 105° C. and 3 to 8 hours. A plurality of conditions may be combined, or heating may be carried out at one temperature and then carried out at another temperature (for example, a temperature higher than the above-described one temperature).

In the method for producing a film capacitor of the present embodiment, the resin supplying step and the curing step may be carried out repeatedly. For example, the resin composition may be cured after supplying the resin composition into the element accommodating space until the bottom part of a rolled body of a film capacitor element is immersed therein, and then, the resin composition may be further supplied into the element accommodating space, and subsequently the resin composition may be cured. That is, supplying and curing of the resin composition may be carried out several times until the entirety of the rolled body of the film capacitor element is covered. By supplying the resin composition into the element accommodating space until the bottom part of the rolled body of the film capacitor element is immersed therein, and then curing the resin composition, at the time of supplying the resin composition thereafter, the film capacitor element can be inhibited from floating by buoyancy to the liquid surface of the resin composition. According to the resin composition of the present embodiment, as mentioned above, since the existing amounts of the fillers at the top side and the bottom side of the mold member in the resin composition are inhibited from being largely different from each other, even in a case in which supplying and curing of the resin composition are carried out several times, the existing amount of the fillers at the top side of the mold member in the cured product of the resin composition that has been supplied previously, and the existing amount of the fillers at the bottom side of the mold member in the cured product of the resin composition that has been supplied later are inhibited from being largely different from each other, and thus, an interface that is generated concomitantly with a difference in the contents of the fillers can be inhibited from being formed between the two cured products.

The method for producing a film capacitor of the present embodiment may also include, before the resin supplying step, an element disposition step of disposing the film capacitor element inside the element accommodating space. Furthermore, in the method for producing a film capacitor of the present embodiment, the film capacitor element may be disposed inside the element accommodating space after the resin composition is supplied into the element accommodating space.

Figure 4:
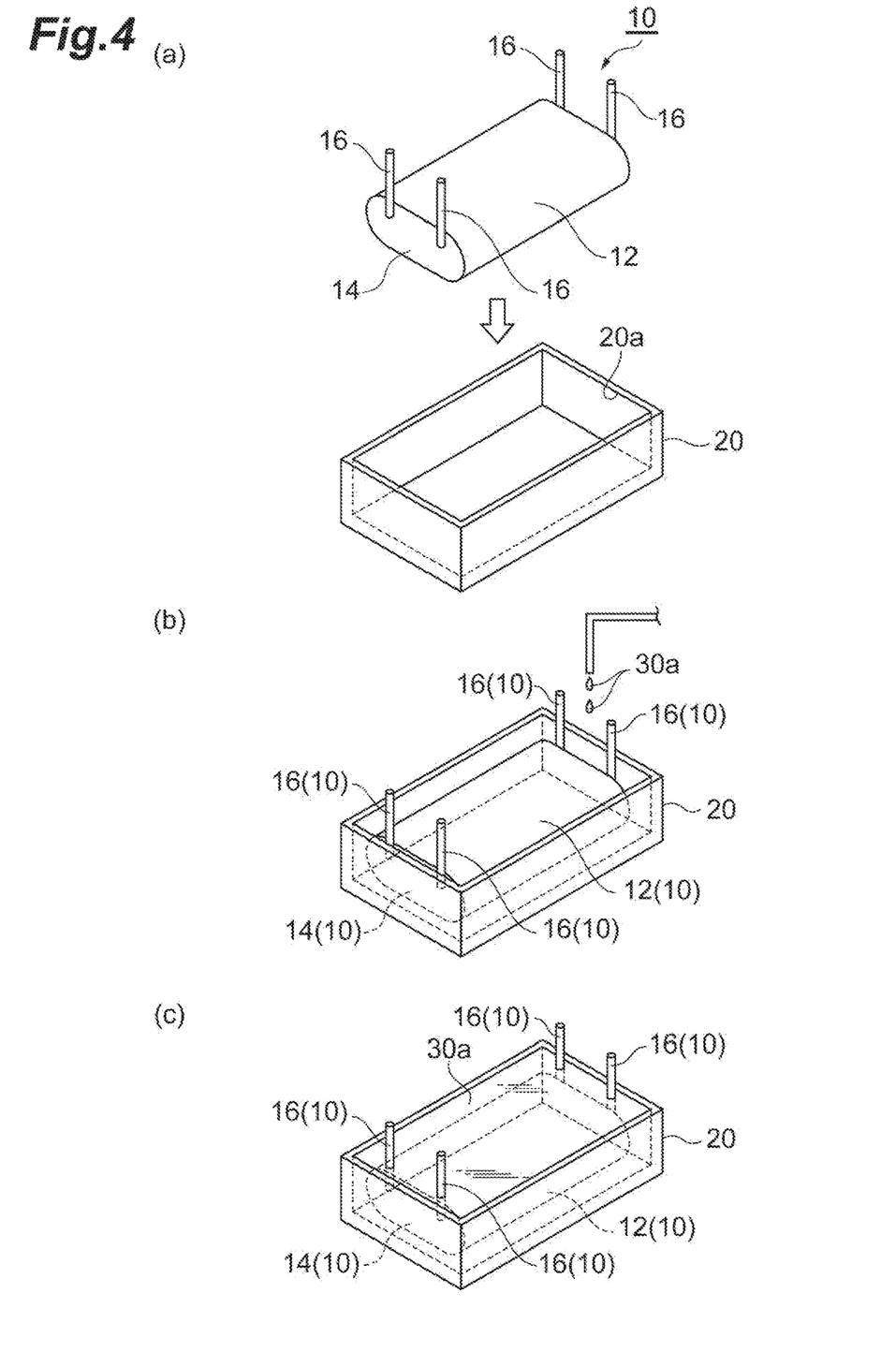
FIG. 4 is a perspective view illustrating a method for producing a molded body of an embodiment of the present invention.

FIG. 4 is a perspective view illustrating a method for producing a film capacitor as an example of the method for producing a molded body of the present embodiment. First, as illustrated in FIG. 4(a), the film capacitor element 10 is disposed inside the element accommodating space 20a of the exterior case 20 in the element disposition step. Next, as illustrated in FIG. 4(b), a resin composition 30a as a curable sealing material is supplied into the element accommodating space 20a in the resin supplying step. Thereby, as illustrated in FIG. 4(c), the resin composition 30a fills the inside of the element accommodating space 20a. Then, in the curing step, the resin composition 30a inside the element accommodating space 20a is cured, thereby a cured product is obtained, and thus the film capacitor 100 illustrated in FIG. 2 and FIG. 3 can be obtained.

Hereinbefore, embodiments of the present invention have been described; however, the present invention is not limited to the above-mentioned embodiments. For example, an embodiment, in which the entirety of the sealing portion that seals the film capacitor element is exposed to the outside without including an exterior case, is also acceptable as long as the film capacitor includes a film capacitor element and a sealing portion that seals the film capacitor element, and the sealing portion contains a resin composition or a cured product thereof. Regarding the film capacitor element to be sealed by the sealing portion, there may be one film capacitor element, or there may be a plurality of film capacitor elements.

Inside the sealing portion of the film capacitor, the film capacitor element may be in contact with the bottom face of the exterior case, without having the sealing portion interposed between the film capacitor element and the bottom face of the exterior case. Inside the sealing portion, the film capacitor element may be in contact with the side wall of the exterior case, without having the sealing portion interposed between the film capacitor element and the side wall of the exterior case.

The film capacitor element is not particularly limited as long as it has a film main body (a capacitor main body, a film element main body) formed from a film. For example, the film capacitor element may have a laminated body of films (film structure formed by laminating films), instead of a rolled body of a film (film structure formed by rolling a film). Regarding the film main body, a rolled body or a laminated body of a metalized film can be used.

Examples

Hereinafter, the content of the present invention will be described in more detail by using Examples and Comparative Examples; however, the present invention is not limited to the following Examples.

<Preparation of Resin Composition>

The following components shown in Tables 1 to 3 were mixed, and thereby resin compositions were prepared.

(Thermosetting Resin)

Bisphenol A type epoxy resin, manufactured by Mitsui Chemicals, Inc., trade name EPOMIK R-139S Bisphenol A type epoxy resin, manufactured by Mitsubishi Chemical Corporation, trade name: JER834

(Curing Agent)

Acid anhydride, 3- or 4-methyl-1,2,3,6-tetrahydrophthalic anhydride, manufactured by Hitachi Chemical Company, Ltd., trade name: HN-2000

(Curing Accelerator)

Benzalkonium chloride, manufactured by NOF CORPORATION, trade name: M2-100R (First Filler: Scale-Like Filler)

Expandable graphite, manufactured by SUZUHIRO CHEMICAL CO., LTD., trade name: GREP-EG, average aspect ratio: 9.5, average major axis: 600 μm Expandable graphite, manufactured by Fuji Graphite Industry Co., Ltd., trade name: EXP-100S, average aspect ratio: 10.5, average major axis: 200 μm Melamine cyanurate, manufactured by Nissan Chemical Corporation, trade name: MC-4000, average aspect ratio: 5, average major axis: 14 μm Melamine cyanurate, manufactured by Nissan Chemical Corporation, trade name: MC-6000, average aspect ratio: 5, average major axis: 2 μm (Second Filler: Other Filler that does not Satisfy Aspect Ratio of 3 to 25)

Carbon black, coloring agent, manufactured by Mitsubishi Chemical Corporation, trade name: MA-100

Crystalline silica, manufactured by FUMITEC, trade name: HC-15, average particle size: 12.8 μm Crystalline silica, manufactured by Sibelco Japan, Ltd., trade name: CA0040, average particle size: 3.65 μm Aluminum hydroxide, manufactured by Nippon Light Metal Company, Ltd., trade name: AL-B143, average particle size: 5 μm (Other Additives)

Antifoaming agent, silicone-based antifoaming agent, manufactured by Shin-Etsu Chemical Co., Ltd., trade name: KS-603

Coupling agent, epoxy group-containing silane coupling agent, manufactured by Dow Corning Corp., trade name: OFS-6040

Plasticizer, epoxy-based plasticizer, manufactured by JAPAN CHEMTECH LTD., trade name: Cardura E10P Flame retardant, aromatic cyclic phosphazene-based flame retardant, manufactured by Otsuka Chemical Co., Ltd., trade name: SPB-100

Flame retardant, aromatic cyclic phosphazene-based flame retardant, manufactured by FUSHIMI Pharmaceutical Co., Ltd., trade name: Rabitle FP-110

Surfactant, polyether ester type surfactant, manufactured by Kusumoto Chemicals, Ltd., trade name: DISPARLON 3600N <Measurement of Physical Properties>

The following physical properties were measured using the above-described resin compositions. The measurement of the physical properties was carried out rapidly after mixing the above-mentioned curing agent and other components. The results of the measurement of the physical properties are presented in Tables 1 to 3.

(Viscosity)

Using a B type rotary viscometer (manufactured by Tokimec, Inc., trade name: BL), the viscosity of the resin composition was measured under the conditions of a temperature of 40° C. and a speed of rotation of 60 rpm (60 rotations). The temperature was adjusted using a constant temperature tank (manufactured by Yamato Scientific Co., Ltd., trade name: BF600).

(Specific Gravity)

The resin composition was injected into a test tube made of polypropylene and having an inner diameter of 18 mm and a length of 15 cm, subsequently the resin composition was thermally cured for 8 hours at 105° C., and thereby a cured product was obtained. The cured product was taken out from the test tube, subsequently 10% of the upper part and 10% of the lower part of the cured product were cut out, and thus an upper part specimen and a lower part specimen were obtained. The specific gravities of the specimens were respectively measured by a water displacement method using an electronic specific gravity meter (manufactured by Mirage Trading Co., Ltd., trade name: SD200L). The proportion of the specific gravity difference was calculated by the following formula as an index for the settleability of the fillers.

Proportion (%) of specific gravity difference=(Specific gravity of lower part specimen−specific gravity of upper part specimen)/(specific gravity of lower part specimen)×100

(Flame Retardancy)

The resin composition was thermally cured for 8 hours at 105° C. to obtain a cured product, and then, the cured product was processed into a rectangular parallelepiped shape having a size of 125 mm in length×13.0 mm in width and a thickness of 5 mm, and thereby a specimen was obtained. Using the specimen, flame retardancy was evaluated according to the testing method of UL94V. According to the determination criteria of UL94V, flame contact in the upper part and flame contact in the lower part were rated in four grades of "V-0", "V-1", "V-2", and "V-NOT" (unclassifiable). "V-0" represents the highest flame retardancy, and flame retardancy decreases in the order of "V-1", "V-2", and "V-NOT".

TABLE 1

| | | | Example | | | | | | |
|---|---|---|---|---|---|---|---|---|---|
| | | | 1 | 2 | 3 | 4 | 5 | 6 | 7 |
| Thermosetting resin | | R-139S | 25.0 | 25.0 | 25.0 | 25.0 | 25.0 | 25.0 | 25.0 |
| | | JER834 | 3.0 | 3.0 | 3.0 | 3.0 | 3.0 | 3.0 | 3.0 |
| Curing agent | | HN-2000 | 22.0 | 22.0 | 22.0 | 22.0 | 22.0 | 22.0 | 22.0 |
| Curing accelerator | | M2-100R | 0.22 | 0.22 | 0.22 | 0.22 | 0.22 | 0.22 | 0.22 |
| First filler (scale-like shape) | Expandable graphite | GREP-EG | 10.0 | | | | | | |
| | | EXP-100S | | 5.0 | 3.0 | 3.0 | 3.0 | 3.0 | 4.0 |
| | Melamine cyanurate | MC-4000 | | | 2.0 | 3.0 | 4.0 | 2.0 | 1.0 |
| | | MC-6000 | | | | | | | |
| Second filler (other filler) | Carbon black | MA-100 | | | | | | | |
| | Crystalline silica | HC-15 | 30.0 | 35.0 | 35.0 | 35.0 | 70.0 | 15.0 | 35.0 |
| | | CA0040 | 30.0 | 35.0 | 35.0 | 35.0 | | 55.0 | 35.0 |
| | Aluminum hydroxide | AL-B143 | | | | | | | |
| Antifoaming agent | | KS-603 | 0.01 | 0.01 | 0.01 | 0.01 | 0.01 | 0.01 | 0.01 |
| Coupling agent | | OFS-6040 | 0.3 | 0.3 | 0.3 | 0.3 | 0.3 | 0.3 | 0.3 |
| Plasticizer | | Cardura E10P | | | | | | | |
| Flame retardant | | SPB-100 | | | | | | | |
| | | Rabitle FP-110 | | | | | | | |
| Surfactant | | DISPARLON 3600N | | | | | | | |
| Total amount of all components [parts by mass] | | | 120.53 | 125.53 | 125.53 | 126.53 | 127.53 | 125.53 | 125.53 |
| Total amount of first filler [parts by mass] | | | 10.0 | 5.0 | 5.0 | 6.0 | 7.0 | 5.0 | 5.0 |
| Total amount of second filler [parts by mass] | | | 60.0 | 70.0 | 70.0 | 70.0 | 70.0 | 70.0 | 70.0 |
| Proportion of first filler in total amount of fillers [% by mass] | | | 14.3 | 6.7 | 6.7 | 7.9 | 9.1 | 6.7 | 67 |

TABLE 1-continued

|  |  |  | Example |  |  |  |  |  |  |
|---|---|---|---|---|---|---|---|---|---|
|  |  |  | 1 | 2 | 3 | 4 | 5 | 6 | 7 |
| Measurement of physical properties | Viscosity | 60 rotations [Pa · s] | 1.5 | 4.1 | 3.9 | 4.5 | 4.8 | 4.7 | 3.5 |
|  | Specific gravity | Upper part | 1.675 | 1.758 | 1.770 | 1.766 | 1.770 | 1.766 | 1.768 |
|  |  | Lower part | 1.681 | 1.797 | 1.780 | 1.777 | 1.786 | 1.776 | 1.783 |
|  |  | Proportion of specific gravity difference [%] | 0.40 | 2.19 | 0.55 | 0.65 | 0.85 | 0.56 | 0.84 |
|  | Flame retardancy | Flame contact in upper part | V-0 | V-0 | V-0 | V-0 | V-0 | V-0 | V-0 |
|  |  | Flame contact in lower part | V-0 | V-0 | V-0 | V-0 | V-0 | V-0 | V-0 |

TABLE 2

|  |  |  | Example |  |  |  |  |  |  |
|---|---|---|---|---|---|---|---|---|---|
|  |  |  | 8 | 9 | 10 | 11 | 12 | 13 | 14 |
| Thermosetting resin |  | R-139S | 25.0 | 25.0 | 25.0 | 25.0 | 25.0 | 25.0 | 25.0 |
|  |  | JER834 | 3.0 | 3.0 | 3.0 | 3.0 | 3.0 | 3.0 | 3.0 |
| Curing agent |  | HN-2000 | 22.0 | 22.0 | 22.0 | 22.0 | 22.0 | 22.0 | 22.0 |
| Curing accelerator |  | M2-100R | 0.22 | 0.22 | 0.22 | 0.22 | 0.22 | 0.22 | 0.22 |
| First filler (scale-like shape) | Expandable graphite | GREP-EG EXP-100S |  |  |  |  |  |  |  |
|  | Melamine cyanurate | MC-4000 | 5.0 | 5.0 | 5.0 |  | 1.0 | 3.0 | 3.0 |
|  |  | MC-6000 |  |  |  | 5.0 |  |  |  |
| Second filler (other filler) | Carbon black | MA-100 | 0.02 | 0.02 | 0.02 | 0.02 | 0.02 | 0.02 | 0.02 |
|  | Crystalline silica | HC-15 | 30.0 | 30.0 | 60.0 | 30.0 | 30.0 | 60.0 | 15.0 |
|  |  | CA0040 | 30.0 | 30.0 |  | 30.0 | 30.0 |  | 45.0 |
|  | Aluminum hydroxide | AL-B143 | 20.0 | 20.0 | 20.0 | 20.0 | 20.0 | 20.0 | 20.0 |
| Antifoaming agent |  | KS-603 | 0.01 | 0.01 | 0.01 | 0.01 | 0.01 | 0.01 | 0.01 |
| Coupling agent |  | OFS-6040 | 0.3 | 0.3 | 0.3 | 0.3 | 0.3 | 0.3 | 0.3 |
| Plasticizer |  | Cardura E10P | 1.2 | 1.2 | 1.2 | 1.2 | 1.2 | 1.2 | 1.2 |
| Flame retardant |  | SPB-100 | 0.5 |  |  | 0.5 |  |  |  |
|  |  | Rabitle FP-110 |  | 2.0 | 2.0 |  | 2.0 | 2.0 | 2.0 |
| Surfactant |  | DISPARLON 3600N |  |  |  |  |  |  |  |
| Total amount of all components [parts by mass] |  |  | 137.25 | 138.75 | 138.75 | 137.25 | 134.75 | 136.75 | 136.75 |
| Total amount of first filler [parts by mass] |  |  | 5.0 | 5.0 | 5.0 | 5.0 | 1.0 | 3.0 | 3.0 |
| Total amount of second filler [parts by mass] |  |  | 80.0 | 80.0 | 80.0 | 80.0 | 80.0 | 80.0 | 80.0 |
| Proportion of first filler in total amount of fillers [% by mass] |  |  | 5.9 | 5.9 | 5.9 | 5.9 | 1.2 | 3.6 | 3.6 |
| Measurement of physical properties | Viscosity | 60 rotations [Pa · s] | 4.8 | 4.9 | 4.5 | 4.6 | 2.8 | 4.1 | 4.6 |
|  | Specific gravity | Upper part | 1.755 | 1.752 | 1.753 | 1.756 | 1.752 | 1.753 | 1.749 |
|  |  | Lower part | 1.757 | 1.755 | 1.756 | 1.758 | 1.765 | 1.762 | 1.756 |
|  |  | Proportion of specific gravity difference [%] | 0.08 | 0.19 | 0.17 | 0.10 | 0.74 | 0.49 | 0.41 |
|  | Flame retardancy | Flame contact in upper part | V-NOT | V-NOT | V-NOT | V-NOT | V-NOT | V-NOT | V-NOT |
|  |  | Flame contact in lower part | V-NOT | V-NOT | V-NOT | V-NOT | V-NOT | V-NOT | V-NOT |

TABLE 3

| | | | Comparative Example | | | |
|---|---|---|---|---|---|---|
| | | | 1 | 2 | 3 | 4 |
| Thermosetting resin | | R-139S | 25.0 | 25.0 | 25.0 | 25.0 |
| | | JER834 | 3.0 | | 3.0 | 3.0 |
| Curing agent | | HN-2000 | 22.0 | 22.0 | 22.0 | 22.0 |
| Curing accelerator | | M2-100R | 0.22 | 0.22 | 0.22 | 0.22 |
| First filler (scale-like shape) | Expandable graphite | GREP-EG | | | | |
| | | EXP-100S | | | | |
| | Melamine cyanurate | MC-4000 | | | | |
| | | MC-6000 | | | | |
| Second filler (other filler) | Carbon black | MA-100 | 0.02 | | 0.02 | 0.02 |
| | Crystalline silica | HC-15 | 35.0 | 35.0 | 30.0 | 30.0 |
| | | CA0040 | 35.0 | 35.0 | 30.0 | 30.0 |
| | Aluminum hydroxide | AL-B143 | | | 20.0 | 20.0 |
| Antifoaming agent | | KS-603 | 0.01 | 0.01 | 0.01 | 0.01 |
| Coupling agent | | OFS-6040 | 0.3 | 0.3 | 0.3 | 0.3 |
| Plasticizer | | Cardura E10P | | | 1.2 | 1.2 |
| Flame retardant | | SPB-100 | | | 0.5 | |
| | | Rabitle FP-110 | | | | 2.0 |
| Surfactant | | DISPARLON 3600N | 0.3 | | | |
| Total amount of all components [parts by mass] | | | 120.85 | 117.53 | 132.25 | 133.75 |
| Total amount of first filler [parts by mass] | | | 0 | 0 | 0 | 0 |
| Total amount of second filler [parts by mass] | | | 70.0 | 70.0 | 80.0 | 80.0 |
| Measurement of physical properties | Viscosity | 60 rotations [Pa · s] | 1.1 | 1.5 | 2.5 | 3.4 |
| | Specific gravity | Upper part | 1.640 | 1.585 | 1.696 | 1.676 |
| | | Lower part | 1.798 | 1.933 | 1.867 | 1.879 |
| | | Proportion of specific gravity difference [%] | 8.78 | 18.00 | 9.15 | 10.84 |
| | Flame retardancy | Flame contact in upper part | V-NOT | V-1 | V-NOT | V-NOT |
| | | Flame contact in lower part | V-NOT | V-0 | V-0 | V-NOT |

As shown in Table 1 and Table 2, in the respective Examples in which a first filler having an aspect ratio of 3 to 25 and a second filler that is different from the first filler were used, the occurrence of a specific gravity difference inside the cured product is suppressed. On the other hand, as shown in Table 3, in the respective Comparative Examples in which the first filler was not used, results with large specific gravity differences inside the cured product are obtained. Furthermore, in the respective Examples, low viscosity of the resin compositions is maintained without using a solvent. In Examples 1 to 7, excellent flame retardancy is achieved.

REFERENCE SIGNS LIST

10: film capacitor element, 12: rolled body, 14: metallikon electrode, 16: lead wire, 20: exterior case, 20a: element accommodating space, 30: sealing portion, 30a: resin composition, 100: film capacitor (molded body), F, F1, F2: filler.

The invention claimed is:

1. A resin composition for casting, comprising a curable component, a first filler containing expandable graphite, and a second filler that is different from the first filler,
   wherein a ratio of a major axis of the first filler with respect to a thickness of the first filler is 3 or more and less than 20.

2. The resin composition according to claim 1, wherein the curable component includes an epoxy resin.

3. The resin composition according to claim 1, wherein a viscosity of the resin composition when measured using a B type viscometer under conditions of 40° C. and 60 rpm is 8.0 Pa·s or less.

4. The resin composition according to claim 1, wherein the first filler further contains melamine cyanurate.

5. The resin composition according to claim 1, wherein the second filler contains silica.

6. A cured product of the resin composition according to claim 1.

7. A molded body comprising: an element and a sealing portion that seals the element,
   wherein the sealing portion contains the resin composition according to claim 1 or a cured product thereof.

8. A method for producing a molded body, the method comprising casting the resin composition according to claim 1 to obtain a molded body.

9. A film capacitor comprising: a film capacitor element and a sealing portion that seals the film capacitor element,
   wherein the sealing portion contains the resin composition according to claim 1 or a cured product thereof.

10. A method for producing a film capacitor, the method comprising casting the resin composition according to claim 1 to obtain a film capacitor comprising a sealing portion that seals a film capacitor element.

11. The resin composition according to claim 1, wherein the curable component includes a curable resin, and
   a content of the curable resin is 18% by mass or more based on a total mass of the resin composition.

12. The resin composition according to claim 1, wherein the first filler further contains at least one selected from the group consisting of scale-like graphite, melamine cyanurate, and wollastonite.

13. The resin composition according to claim 1, wherein the major axis of the first filler is 5 to 800 μm.

14. The resin composition according to claim 1, wherein a content of the first filler is 9% by mass or less based on a sum amount of the first filler and the second filler.

15. The resin composition according to claim 1, wherein a content of the first filler is 1.5% to 30% by mass based on a total mass of the resin composition.

16. The resin composition according to claim 1, wherein the second filler contains carbon black.

17. The resin composition according to claim 1, wherein the second filler contains aluminum hydroxide.

18. The resin composition according to claim 1, wherein a particle size of the second filler is 3 to 30 μm.

19. The resin composition according to claim 1, wherein a content of the second filler is 30% to 90% by mass based on a total mass of the resin composition.

20. A resin composition for casting, comprising a curable component, a first filler containing melamine cyanurate, and a second filler containing silica,
wherein a ratio of a major axis of the first filler with respect to a thickness of the first filler is 3 to 25, and
a content of the silica is 30 to 55.8 mass % based on a total mass of the resin composition.

\* \* \* \* \*